(12) United States Patent
Hellman (10) Patent No.: US 7,613,351 B2
(45) Date of Patent: Nov. 3, 2009

(54) VIDEO DECODER WITH DEBLOCKER WITHIN DECODING LOOP

(75) Inventor: Timothy Hellman, Concord, MA (US)

(73) Assignee: Broadcom Corporation, Irvine, CA (US)

(*) Notice: Subject to any disclaimer, the term of this patent is extended or adjusted under 35 U.S.C. 154(b) by 882 days.

(21) Appl. No.: 10/963,677

(22) Filed: Oct. 13, 2004

(65) Prior Publication Data

US 2005/0259879 A1 Nov. 24, 2005

Related U.S. Application Data

(60) Provisional application No. 60/573,369, filed on May 21, 2004.

(51) Int. Cl.
*G06K 9/36* (2006.01)
(52) U.S. Cl. .................. 382/238; 382/232; 382/236
(58) Field of Classification Search .............. 382/233, 382/232, 236, 238, 239; 375/240.16, 240.27, 375/240.14, 240.24, 240.12, E7.19, E7.144, 375/E7.086, E7.088; 348/402.1, E5.077
See application file for complete search history.

(56) References Cited

U.S. PATENT DOCUMENTS

| | | | | |
|---|---|---|---|---|
| 6,031,575 A | * | 2/2000 | Suzuki et al. | 375/240.14 |
| 6,078,616 A | * | 6/2000 | Ozcelik et al. | 375/240.27 |
| 6,175,597 B1 | * | 1/2001 | Ozcelik et al. | 375/240.27 |
| 6,285,715 B1 | * | 9/2001 | Ozcelik et al. | 375/240.27 |
| 6,449,311 B1 | * | 9/2002 | Ozcelik et al. | 375/240.16 |
| 6,704,363 B1 | * | 3/2004 | Kim | 375/240.27 |

\* cited by examiner

*Primary Examiner*—Anh Hong Do
(74) *Attorney, Agent, or Firm*—McAndrews Held & Malloy, Ltd.

(57) ABSTRACT

Methods and systems for processing an encoded video stream are disclosed. Aspects of the method may comprise generating a plurality of temporal or spatial prediction pixels based on mode information within the encoded video stream. A plurality of prediction errors may be generated from a plurality of quantized frequency coefficients generated from the encoded video stream. At least one current macroblock may be generated using the generated plurality of temporal or spatial prediction pixels based on the generated plurality of prediction errors. The encoded video stream may be symbol interpreted using context adaptive variable length coding and/ or context adaptive binary arithmetic coding. The encoded video stream may be buffered prior to the symbol interpretation. The plurality of quantized frequency coefficients may be generated from the encoded video stream. If the encoded video stream comprises temporal prediction mode information, the plurality of temporal prediction pixels may be generated.

34 Claims, 6 Drawing Sheets

Top Field 110T                    Bottom Field 110B

VIDEO DECODER WITH DEBLOCKER WITHIN DECODING LOOP

RELATED APPLICATIONS

This application makes reference to, claims priority to, and claims the benefit of U.S. Provisional Patent Application 60/573,369, filed on May 21, 2004 and entitled "Video Decoder With Deblocker Within Decoding Loop," the complete subject matter of which is hereby incorporated herein by reference in its entirety.

This application is related to the following applications, each of which is incorporated herein by reference in its entirety for all purposes:

U.S. patent application Ser. No. 11/000,731 filed Dec. 1, 2004;

U.S. patent application Ser. No. 10/985,501 filed Nov. 10, 2004;

U.S. patent application Ser. No. 11/112,632 filed Apr. 22, 2005,

U.S. patent application Ser. No. 10/985,110 filed Nov. 10, 2004;

U.S. patent application Ser. No. 10/965,172 filed Oct. 13, 2004;

U.S. patent application Ser. No. 10/972,931 filed Oct. 25, 2004;

U.S. patent application Ser. No. 10/974,179 filed Oct. 27, 2004;

U.S. patent application Ser. No. 10/974,872 filed Oct. 27, 2004;

U.S. patent application Ser. No. 10/970,923 filed Oct. 21, 2004;

U.S. patent application Ser. No. 10/963,680 filed Oct. 13, 2004;

U.S. patent application Ser. No. 11/013,768 filed Dec. 16, 2004;

U.S. patent application Ser. No. 11/102,389 filed Apr. 8, 2005;

U.S. patent application Ser. No. 11/135,929 filed May 23, 2005; and

U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The ITU-H.264 Standard (H.264), also known as MPEG-4, Part 10, and Advanced Video Coding, may encode a video stream on a frame-by-frame basis, and may encode video frames on a macroblock-by-macroblock basis. The MPEG-4 standard may specify the use of spatial prediction, temporal prediction, discrete cosine transformation (DCT), interlaced coding, and lossless entropy coding, for example, to compress macroblocks within a video stream.

The MPEG-4 video compression standard may be utilized to encode video information on a macroblock-by-macroblock basis. During encoding of video information utilizing the MPEG-4 standard, for example, prediction error information may be encoded together with prediction mode information, as well as with other side information necessary for the decoding process. In order to encode the prediction error information, a discrete cosine transformation may be applied to transform the prediction error information into frequency domain coefficients prior to encoding. During the encoding and the transformation processes, certain information relating to the prediction error, for example, may be lost. As a result of the missing information, the quality of the decoded video signal may be decreased. More specifically, transform blockiness may appear in the decoded video in the form of square grid artifacts, for example. Other artifacts may also appear in the decoded video due to missing video information.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing an encoded video stream. Aspects of the method may comprise generating a plurality of temporal or spatial prediction pixels based on mode information within the encoded video stream. A plurality of prediction errors may be generated from a plurality of quantized frequency coefficients generated from the encoded video stream. At least one current macroblock may be generated using the generated plurality of temporal or spatial prediction pixels based on the generated plurality of prediction errors. The encoded video stream may be symbol interpreted using context adaptive variable length coding (CAVLC) and/or context adaptive binary arithmetic coding (CABAC).

The encoded video stream may be buffered prior to the symbol interpretation. The plurality of quantized frequency coefficients may be generated from the encoded video stream. If the encoded video stream comprises temporal prediction mode information, the plurality of temporal prediction pixels may be generated. If the encoded video stream comprises spatial prediction mode information, the plurality of spatial prediction pixels may be generated. The generated at least one current macroblock may be deblocked and the deblocked macroblock may be buffered. A subsequent plurality of temporal prediction pixels may be generated utilizing at least the buffered macroblock.

Aspects of the system may comprise a motion compensator that generates a plurality of temporal prediction pixels and a spatial predictor that generates a plurality of spatial prediction pixels, based on mode information within the encoded video stream. A transformer may generate a plurality of prediction errors from a plurality of quantized frequency coefficients generated from the encoded video stream. A reconstructor may generate at least one current macroblock using the generated plurality of temporal or spatial prediction pixels based on the generated plurality of prediction errors. A symbol interpreter may interpret symbols in the encoded video stream utilizing CAVLC and/or CABAC.

A code buffer may buffer the encoded video stream prior to the symbol interpretation. The symbol interpreter may generate the plurality of quantized frequency coefficients from the encoded video stream. If the encoded video stream comprises temporal prediction mode information, the motion compensator may generate the plurality of temporal prediction pixels. If the encoded video stream comprises spatial prediction mode information, the spatial predictor may generate the plurality of spatial prediction pixels. A deblocker may deblock the generated at least one current macroblock. A buffer may buffer the deblocked at least one current macroblock. The predictor may generate a subsequent plurality of temporal prediction pixels utilizing at least the buffered macroblock. The transformer may comprise an inverse scanner, quantizer and transformer (ISQDCT).

Another aspect of the system may comprise a decoding circuit. The decoding circuit may comprise a code buffer coupled to an interpreter. A context block may be coupled to the interpreter. An ISQDCT, a motion compensator and a spatial predictor may be coupled to the output of the interpreter. A reconstructor may be coupled to an output of the ISQDCT. A deblocker may be coupled to an output of the reconstructor. A picture buffer may be coupled to an output of the deblocker. A display engine may be coupled to an output of the picture buffer.

The interpreter may comprise a CAVLC interpreter and/or a CABAC interpreter. The decoding circuit may also comprise a CPU coupled to the interpreter. An output of the spatial predictor may be coupled to a first input of the reconstructor. An output of the motion compensator may be coupled to a second input of the reconstructor. The interpreter may be coupled to a first input of the deblocker. The picture buffer may be coupled to a second input of the deblocker and to an input of the motion compensator.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain aspects of the invention may be found in a method and system for processing an encoded video stream. During encoding of a video stream, context adaptive binary arithmetic coding (CABAC) or context adaptive variable length coding (CAVLC) may be used to encode a video stream. In addition, macroblocks within the video stream may be spatially or temporally encoded. Depending on whether temporal or spatial prediction methods were utilized during encoding, a prediction error information and side information associated with the prediction method may also be encoded together with the video stream. For example, the side information may comprise a prediction mode information and motion vector information. The prediction error information and the side information may be utilized by a decoder to decode the encoded video stream.

After an encoded stream is received by a decoder, temporal or spatial prediction pixels may be generated depending on a prediction mode information interpreted from the encoded video stream. In addition, quantized frequency coefficients may also be generated from the encoded video stream and corresponding prediction errors may be generated from the quantized frequency coefficients. If one or more macroblocks within the encoded video stream were temporally predicted, temporal prediction pixels may be generated from the received side information. Similarly, if one or more macroblocks within the encoded video stream were spatially predicted, spatial prediction pixels may be generated from the received side information. The video stream may then be decoded on a macroblock-by-macroblock basis in accordance with the type of prediction utilized during individual macroblock encoding. A macroblock may be generated using the temporal or spatial prediction pixels based on the generated prediction errors.

In order to reduce the effects of transform blockiness in the decoded video stream, a decoder may utilize a deblocker within a decoding loop of the decoder. In one aspect of the invention, the deblocker may comprise a filter adapted to decrease transform blockiness in the decoded video signal.

Figure 1:
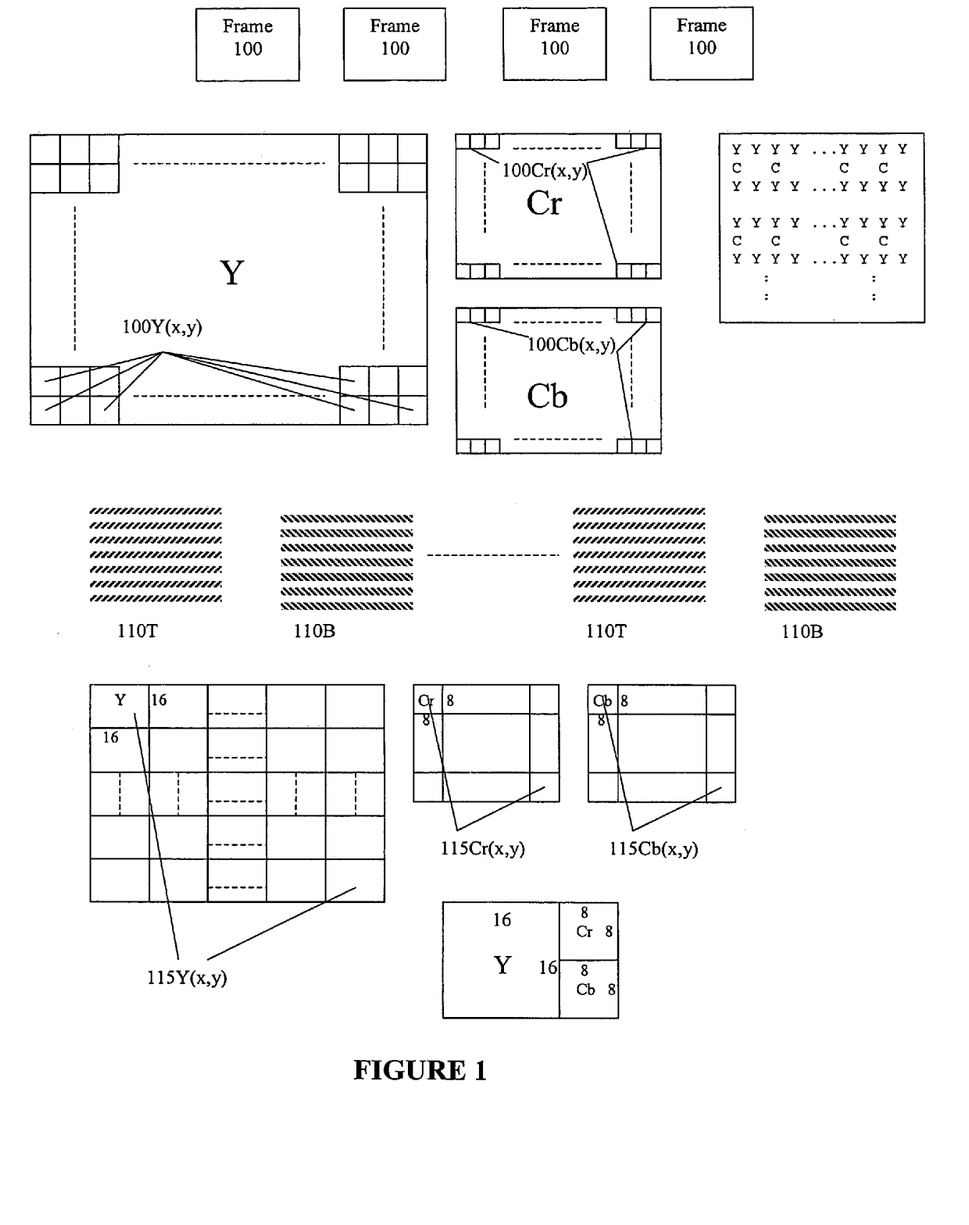
FIG. 1 is a block diagram of a frame.

FIG. 1 is a block diagram of a frame 100. A video camera may capture frames 100 from a field of view during time periods known as frame durations. The successive frames 100 may form a video sequence. A frame 100 may comprise two-dimensional grid(s) of pixels 100(x,y). For color video, each color component may be associated with a two-dimensional grid of pixels. For example, a video sequence may include a luma, chroma red, and chroma blue components. Accordingly, the luma, chroma red, and chroma blue components may be associated with two-dimensional grids of pixels 100Y(x,y), 100Cr(x,y), and 100Cb(x,y), respectively. When the grids of two dimensional pixels 100Y(x,y), 100Cr(x,y), and 100Cb(x,y) from each frame 100 are overlayed on a display device 110, the result may comprise a picture of the field of view at the frame duration that the frame was captured.

Since the human eye may be more perceptive to the luma characteristics of video compared to the chroma red and chroma blue characteristics, there may be more pixels in the grid of luma pixels 100Y(x,y), compared to the grids of chroma red 100Cr(x,y) and chroma blue 100Cb(x,y) pixels. In the MPEG 4:2:0 standard, the grids of chroma red 100Cr(x,y) and chroma blue pixels 100Cb(x,y) may comprise half as many pixels as the grid of luma pixels 100Y(x,y) in each direction.

The chroma red 100Cr(x,y) and chroma blue 100Cb(x,y) pixels may be overlaid by the luma pixels in each even-numbered column 100Y(x, 2y), one-half a pixel below each even-numbered line 100Y(2x, y). In other words, the chroma red and chroma blue pixels 100Cr(x,y) and 100Cb(x,y) may comprise overlaid pixels 100Y(2x+½, 2y).

If a video stream is interlaced during encoding, the even-numbered lines 100Y(2x,y), 100Cr(2x,y), and 100Cb(2x,y) may be captured during half of the frame duration, or during a field duration. The odd-numbered lines 100Y(2x+1,y), 100Cr(2x+1,y), and 100Cb(2x+1,y) may be captured during the other half of the frame duration. The even numbered lines 100Y(2x,y), 100Cr(2x,y), and 100Cb(2x,y) may form a top field 110T, while the odd-numbered lines 100Y(2x+1,y), 100Cr(2x+1,y), and 100Cb(2x+1,y) may form a bottom field 110B. The top field 110T and the bottom field 110B may comprise two dimensional grids of luma 110YT(x,y), chroma red 110CrT(x,y), and chroma blue 110CbT(x,y) pixels.

Luma pixels in the frame 100Y(x,y), or in the top/bottom fields 110YT/B(x,y), may be divided into 16×16 pixel 100Y (16x→16x+15, 16y→16y+15) blocks 115Y(x,y). For each block of luma pixels 115Y(x,y), there may be a corresponding 8×8 block of chroma red pixels 115Cr(x,y) and chroma blue pixels 115Cb(x,y) comprising chroma red and chroma blue pixels that may be overlaid by the block of luma pixels 115Y (x,y). A block of luma pixels 115Y(x,y), and the corresponding blocks of chroma red pixels 115Cr(x,y) and chroma blue pixels 115Cb(x,y) may be collectively known as a macroblock 120. Macroblocks may be grouped and each grouping may be referred to as a slice group. A plurality of slice groups may form a video picture.

A video sequence comprises a plurality of encoded frames and the encoded frames 100 may comprise a plurality of encoded macroblocks 120. The encoded video sequence is known as a video elementary stream. The video elementary stream may comprise a bitstream that may be transmitted over a communication network and received by a receiver comprising a decoder. Transmission of a bitstream instead of a video sequence may result in substantially less bandwidth being consumed during transmission.

Spatial Prediction

Figure 2A:
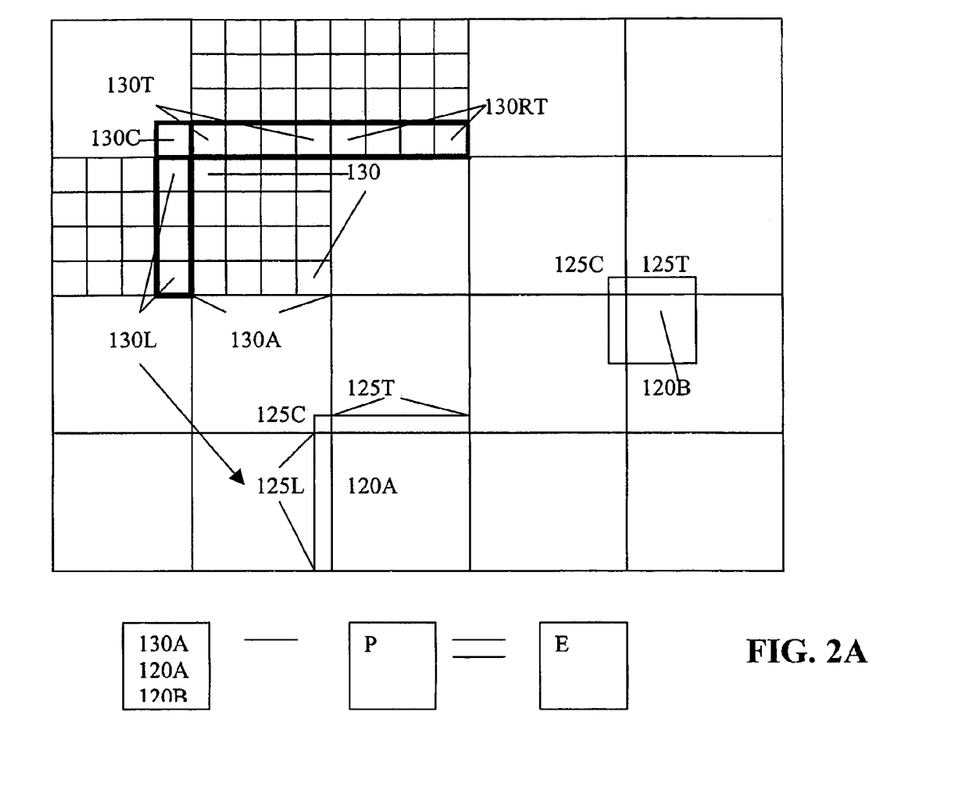
FIG. 2A is a block diagram describing spatially predicted macroblocks.

FIG. 2A is a block diagram describing spatially encoded macroblocks 120A, 120B and 130A. Spatial prediction may also be referred to as intra prediction, and may involve prediction of frame pixels from neighboring pixels. The pixels of a spatially encoded macroblock may be predicted either in a 16×16 mode, in an 8×8 mode, or in a 4×4 mode.

In the 16×16 and 8×8 modes, illustrated by macroblocks 120A and 120B, respectively, the pixels of each macroblock may be predicted from a combination of left edge pixels 125L, a corner pixel 125C, and top edge pixels 125T. The difference between macroblocks 120A and 120B and prediction pixels P may be referred to as the prediction error E. The prediction error E may be calculated and encoded along with an identification of the prediction pixels P and a prediction mode.

In the 4×4 mode, the macroblock 130C may be divided into 4×4 pixel partitions 130. The 4×4 pixel partitions 130 of the macroblock 130A may be predicted from a combination of left edge partitions 130L, a corner partition 130C, top edge partitions 130T, and top right partitions 130TR. The difference between the macroblock 130A and prediction pixels P may be referred to as the prediction error E. The prediction error E may be calculated and encoded along with an identification of the prediction pixels and the prediction mode. During encoding, a macroblock may be encoded as the combination of the prediction errors E representing its partitions.

Temporal Prediction

Figure 2B:
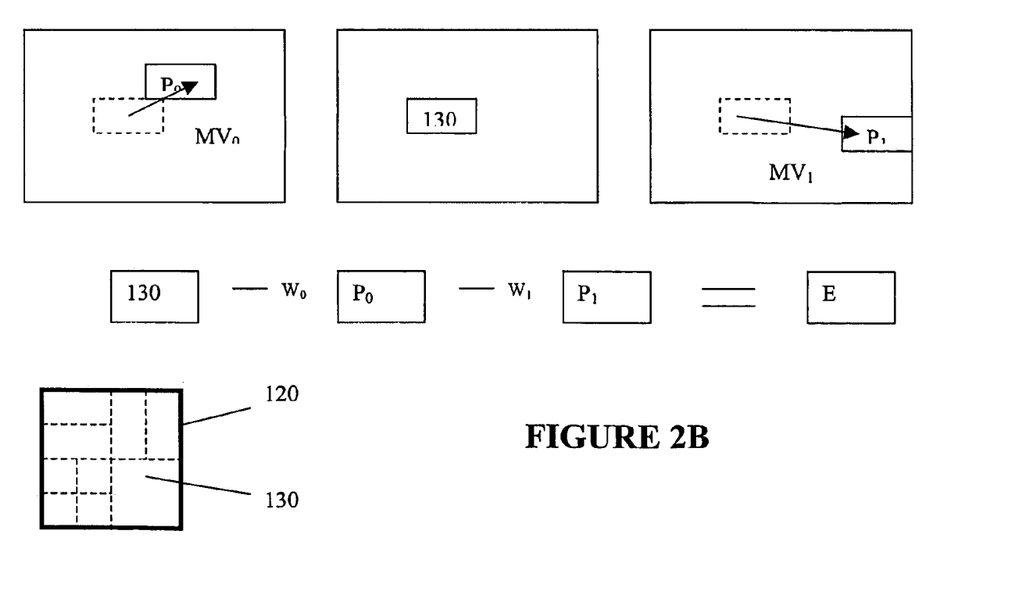
FIG. 2B is a block diagram describing temporally predicted macroblocks.

FIG. 2B is a block diagram describing temporally encoded macroblocks 120. The temporally encoded macroblocks 120 may be divided into 16×8, 8×16, 8×8, 4×8, 8×4, and/or 4×4 partitions 130. Each partition 130 of a macroblock 120 may be compared to the pixels of other frames, or fields, for a similar block of pixels P. A macroblock 120 may be encoded as the combination of the prediction errors E representing its partitions 130.

The similar block of pixels may be referred to as the prediction pixels P. The difference between the partition 130 and the prediction pixels P may be referred to as the prediction error E. The prediction error E may be calculated and encoded, along with an identification of the prediction pixels P. The prediction pixels P may be identified by motion vectors MV. Motion vectors MV may correspond to the spatial displacement between the partition 130 and the prediction pixels P and may be predicted from neighboring partitions.

Each partition 130 may be also predicted from blocks of pixels P in more than one field/frame. For example, in bi-directional coding, the partition 130 may be predicted from two weighted blocks of pixels, $P_0$ and $P_1$, adjacent to a current block of pixels comprising the partition 130. In this way, partition 130 may be predicted utilizing partitions $P_0$ and $P_1$ and their corresponding motion vectors $MV_0$ and $MV_1$. A prediction error E may be calculated as the difference between the weighted average of the prediction blocks $w_0 P_0 + w_1 P_1$ and the partition 130. During encoding of a video stream, the prediction error E and an identification of the prediction blocks $P_0$ and $P_1$ may be encoded with the video stream. The prediction blocks $P_0$ and $P_1$ may be identified by the motion vectors $MV_0$ and $MV_1$, respectively.

The weights $w_0$ and $w_1$ may be encoded explicitly or may be implied from an identification of the field/frame containing the prediction blocks $P_0$ and $P_1$. The weights $w_0$ and $w_1$ may be implied from the distance between the frames/fields containing the prediction blocks $P_0$ and $P_1$ and the frame/field containing the current partition 130. The weights $w_0$ and $w_1$ may be calculated as follows:

$$w_0 = 1 - T_0/(T_0 + T_1); \text{ and}$$

$$w_1 = 1 - T_1/(T_0 + T_1),$$

where $T_0$ may indicate the number of frame/field durations between the frame/field containing $P_0$ and the frame/field containing the current partition 130. Similarly, $T_1$ may indicate the number of frame/field durations between the frame/field containing $P_1$ and the frame/field containing the current partition 130.

DCT, Quantization, and Scanning

Figure 2C:
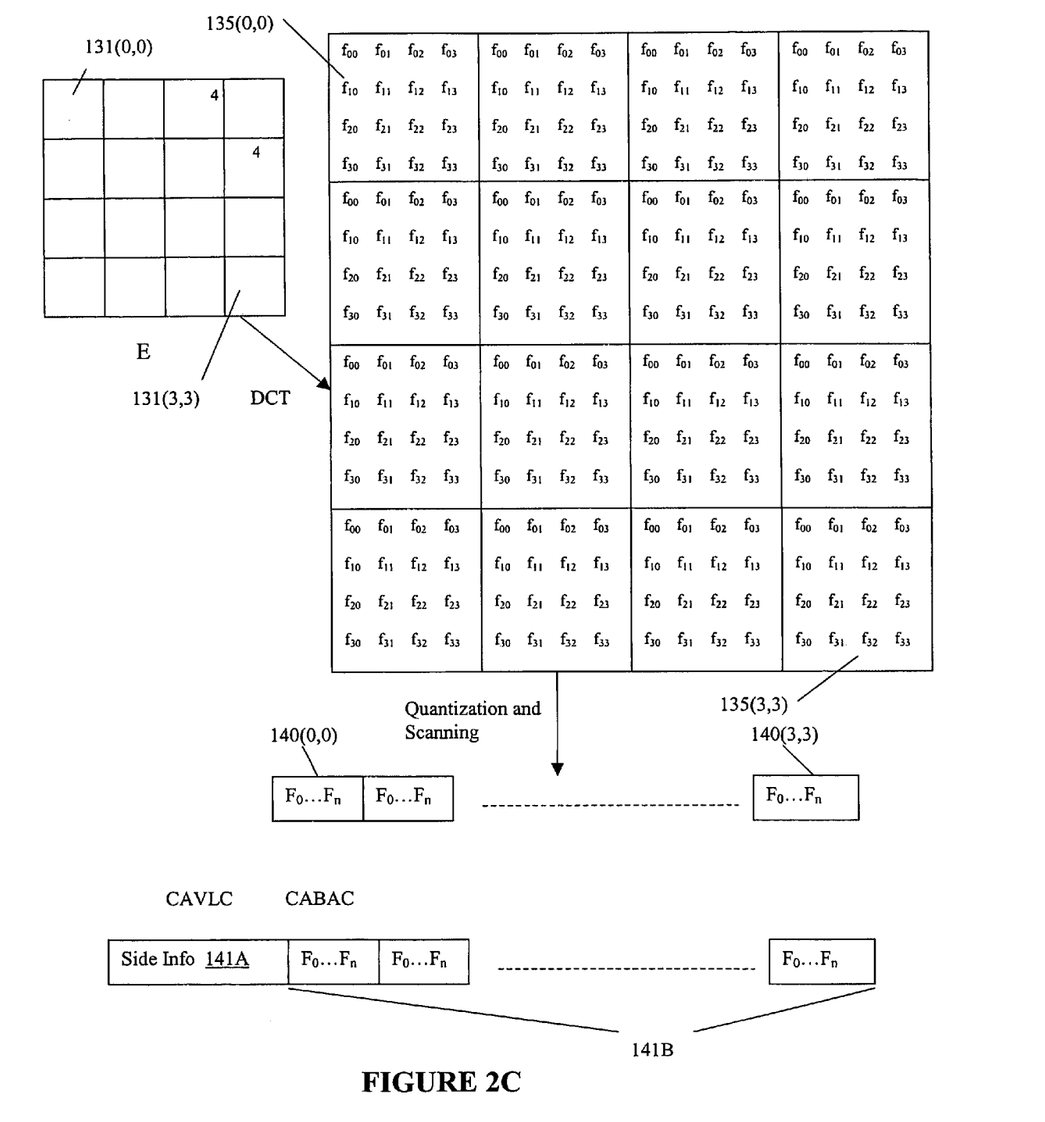
FIG. 2C is a block diagram describing the encoding of a prediction error.

FIG. 2C is a block diagram describing the encoding of the prediction error E. With both spatial prediction and temporal prediction, a macroblock within an elementary stream, such as macroblock 120 of FIG. 2B, may be represented by a prediction error E and a prediction block P. The prediction error E may comprise two-dimensional grid of pixel values for the luma Y, chroma red Cr, and chroma blue Cb components with the same dimensions as the macroblock 120 of FIG. 2B. For example, the prediction error E may be divided into sixteen 4×4 partitions 131(0,0) to 131(3, 3).

A discrete cosine transformation (DCT) may be used to transform the 4×4 partitions 131(0,0) to 131(3,3) of the prediction error E to the frequency domain, thereby resulting in sixteen corresponding partition sets 135(0,0) to 135(3,3) of frequency coefficients $f_{00}$ to $f_{33}$ in each partition set. The sets of frequency coefficients may then be quantized and scanned, resulting in sets 140(0,0) to 140(3,3) of quantized frequency coefficients $F_0$ to $F_n$ in each set.

Macroblock Adaptive Frame/Field Coding

Figure 3:
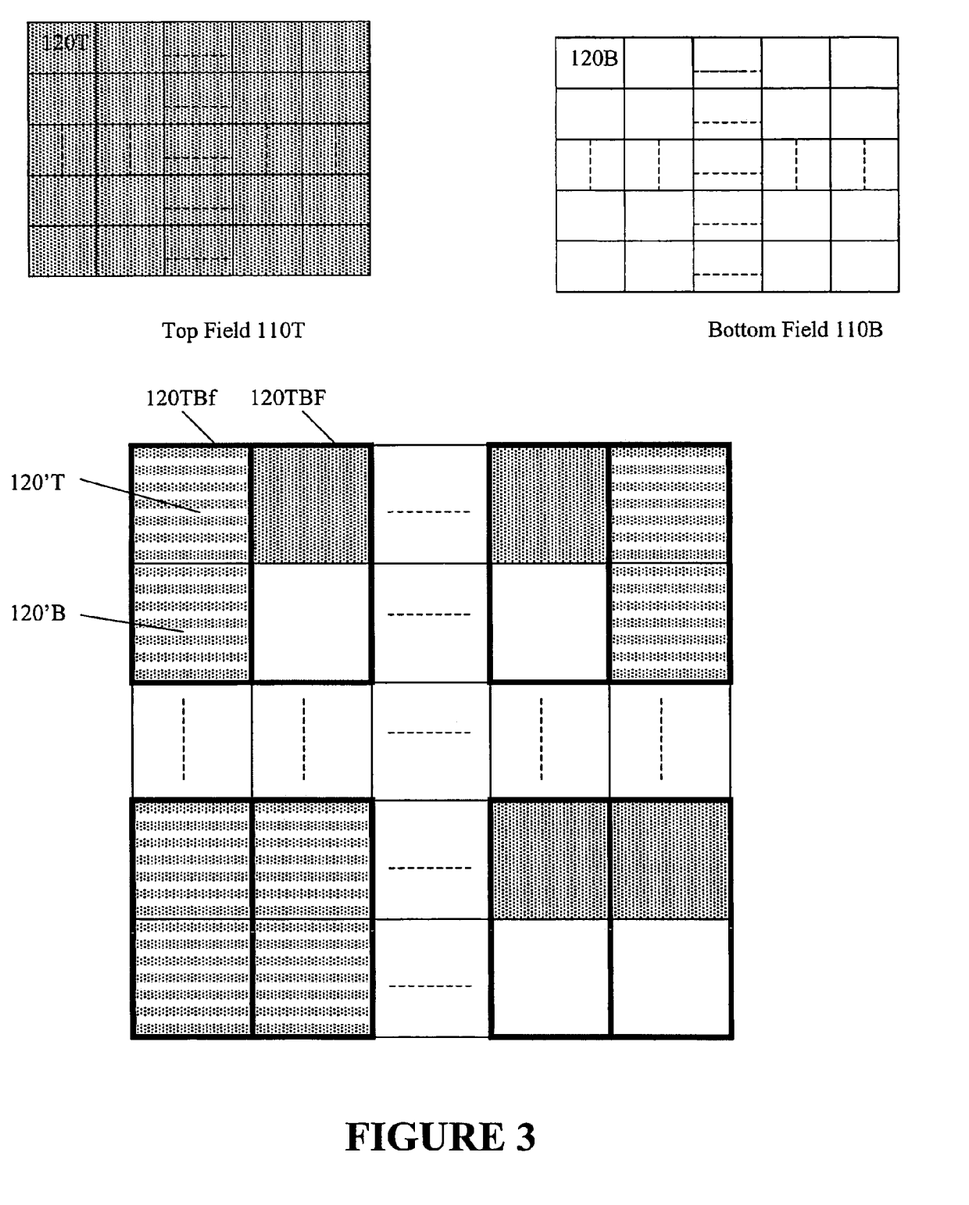
FIG. 3 is a block diagram describing the encoding of macroblocks for interlaced fields in accordance with macroblock adaptive frame/field coding.

FIG. 3 is a block diagram describing the encoding of macroblocks for interlaced fields. As noted above, interlaced fields, top field 110T(x,y) and bottom field 110B(x,y), may represent either even or odd-numbered lines.

In macroblock adaptive frame/field coding (MBAFF), each macroblock 120T in a top field may be paired with macroblock 120B in a bottom field that is interlaced with it.

The macroblocks 120T and 120B may then be coded as a macroblock pair 120TB. The macroblock pair 120TB may be coded separately, such as macroblock pair 120TBF, or may be interlaced, such as macroblock pair 120TBf. Where the macroblock pair 120TBF is encoded separately, the macroblock 120T may be encoded first, followed by encoding of macroblock 120B. Where the macroblock pair 120TBf is interlaced, the macroblocks 120T and 120B may be deinterlaced. The foregoing may result in two new macroblocks 120'T and 120'B. The macroblock 120'T may be encoded first, followed by encoding of macroblock 120'B.

Entropy Coding

For temporally or spatially encoded macroblocks, the motion vectors information, the quantized frequency coefficients and the prediction mode information may be encoded together with the elementary video stream. Referring again to FIG. 2C, the motion vectors information and the prediction mode information may be encoded as a side information 141A. The quantized frequency coefficients 141B and the side information 141A may be encoded and transmitted together with the encoded video stream to a decoder. The side information 141A and the quantized frequency coefficients 141B may be encoded utilizing CAVLC and/or CABAC, for example.

In one aspect of the invention, a decoder may receive the side information 141A, the quantized frequency coefficients 141B and the encoded video stream. The side information 141A and the quantized frequency coefficients 141B may then be extracted from the received encoded stream. The motion vector information, the prediction mode information and the prediction error information may be utilized to decode the encoded video stream.

In the MPEG-4 video standard, either CAVLC or CABAC may be utilized for encoding frequency coefficients, motion vector information and prediction mode information. Once an encoding method is selected by an encoder, all information may be encoded utilizing only the selected encoding method. After a decoder receives the encoded information, it may detect CABAC or CAVLC, for example, as the encoding method and may then decode the quantized frequency coefficients information, the prediction mode information and the motion vector information using the detected encoding method.

If CABAC coding is utilized for encoding video stream information, the information may first be transformed to CABAC binary symbols, or bins. The bins may then be transformed to CABAC symbols. If CAVLC is utilized for encoding, symbols in the video stream may be encoded based on their probability to occur again within the video stream. In this way, the most probable symbols may be encoded utilizing the fewest number of bits. Similarly, the least probable symbols may be encoded utilizing a larger number of bits.

Figure 4:
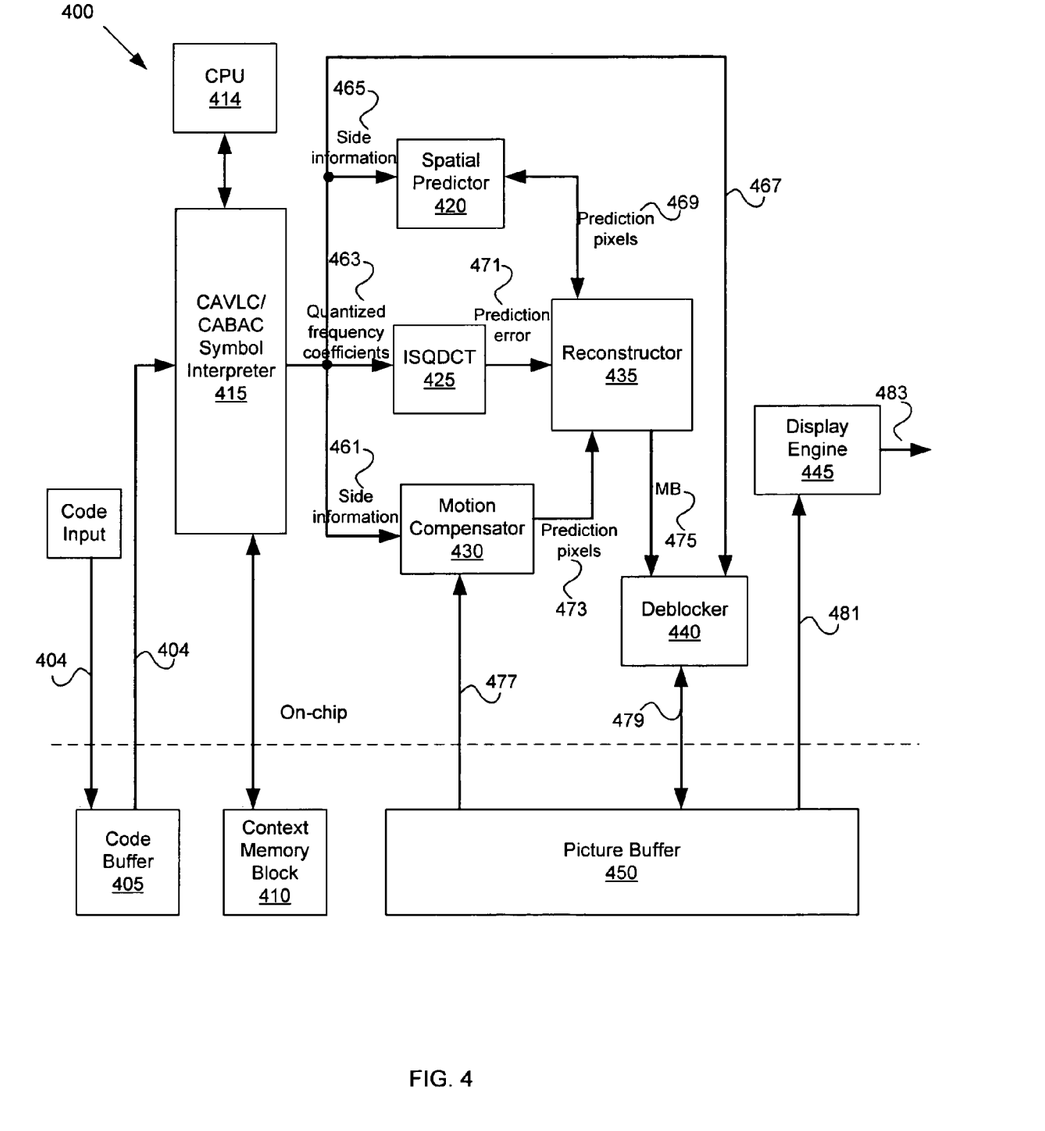
FIG. 4 is a block diagram of a video decoder, in accordance with an embodiment of the invention.

FIG. 4 is a block diagram describing an exemplary video decoder 400, in accordance with an embodiment of the invention. Referring to FIG. 4, the video decoder 400 may comprise a code buffer 405, a symbol interpreter 415, a context memory block 410, a CPU 414, a spatial predictor 420, an inverse scanner, quantizer, and transformer (ISQDCT) 425, a motion compensator 430, a reconstructor 435, a deblocker 440, a picture buffer 450, and a display engine 445.

The code buffer 405 comprises suitable circuitry, logic and/or code and may be adapted to receive and buffer the video elementary stream 404 prior to interpreting it by the symbol interpreter 415. The video elementary stream 404 may be encoded in a binary format using CABAC or CAVLC, for example. The code buffer 405 may be adapted to output different length of the elementary video stream 404 as may be requested by the symbol interpreter 415. The code buffer 405 may comprise a portion of a memory system, such as a dynamic random access memory (DRAM).

The symbol interpreter 415 comprises suitable circuitry, logic and/or code and may be adapted to interpret the elementary video stream 404 to obtain quantized frequency coefficients information and additional side information necessary for decoding of the elementary video stream. The symbol interpreter 415 may also be adapted to interpret either CABAC or CAVLC encoded video stream, for example. In one aspect of the invention, the symbol interpreter 415 may comprise a CAVLC decoder and a CABAC decoder. Quantized frequency coefficients 463 may be communicated to the ISQDCT 425, and the side information 461 and 465 may be communicated to the motion compensator 430 and the spatial predictor 420, respectively. Depending on the prediction mode for each macroblock associated with an interpreted set of quantized frequency coefficients 463, the symbol interpreter 415 may provide side information either to a spatial predictor 420, if spatial prediction was used during encoding, or to a motion compensator 430, if temporal prediction was used during encoding. The side information 461 and 465 may comprise prediction mode information and/or motion vector information, for example.

In order to increase processing efficiency, a CPU 414 may be coupled to the symbol interpreter 415 to coordinate the interpreting process for each macroblock within the bitstream 404. In addition, the symbol interpreter 415 may be coupled to a context memory block 410. The context memory block 410 may be adapted to store a plurality of contexts that may be utilized for interpreting the CABAC and/or CAVLC-encoded bitstream. The context memory 410 may be another portion of the same memory system as the code buffer 405, or a portion of another memory system, for example.

After interpreting by the symbol interpreter 415, sets of quantized frequency coefficients 463 may be communicated to the ISQDCT 425. The ISQDCT 425 comprises suitable circuitry, logic and/or code and may be adapted to generate the prediction error E 471 from a set of quantized frequency coefficients received from the symbol interpreter 415. For example, the ISQDCT 425 may be adapted to transform the quantized frequency coefficients 463 back to spatial domain using an inverse transform. After the prediction error E 471 is generated, it may be communicated to the reconstructor 435.

The spatial predictor 420 and the motion compensator 430 comprises suitable circuitry, logic and/or code and may be adapted to generate prediction pixels 469 and 473, respectively, utilizing side information received from the symbol interpreter 415. For example, the spatial predictor 420 may generate the prediction pixels P 469 for spatially predicted macroblocks, while the motion compensator 430 may generate prediction pixels P 473 for temporally predicted macroblocks. The prediction pixels P 473 may comprise prediction pixels $P_0$ and $P_1$, for example, associated with motion compensation vectors in frames/fields neighboring a current frame/field. The motion compensator 430 may retrieve the prediction pixels $P_0$ and $P_1$, from the picture buffer 450 via the connection 477. The picture buffer 450 may store previously decoded frames or fields.

The reconstructor 435 comprises suitable circuitry, logic and/or code and may be adapted to receive the prediction error E 471 from the ISQDCT 425, as well as the prediction pixels 473 and 469 from either the motion compensator 430 or the spatial predictor 420, respectively. The pixel reconstructor 435 may then reconstruct a macroblock 475 from the prediction error 471 and the side information 469 or 473. The reconstructed macroblock 475 may then be communicated to a deblocker 440, within the decoder 400.

If the spatial predictor 420 is utilized for generating prediction pixels, reconstructed macroblocks may be communicated back from the reconstructor 435 to the spatial predictor 420. In this way, the spatial predictor 420 may utilize pixel information along a left, a corner or a top border with a neighboring macroblock to obtain pixel estimation within a current macroblock.

The deblocker 440 comprises suitable circuitry, logic and/or code and may be adapted to filter the reconstructed macroblock 475 received from the reconstructor 435 to reduce artifacts in the decoded video stream.

During encoding of a video stream, a prediction error information may be transformed to quantized frequency coefficients utilizing a discrete cosine transformation, for example. During the transformation and compression process within a video encoder, certain information within the quantized frequency coefficients may be lost. As a result, after quantized frequency coefficients are transformed back to prediction error information and a macroblock is reconstructed utilizing the generated prediction error information and prediction pixels information, certain artifacts may appear in the decoded video stream. For example, transform blockiness may appear in the decoded video stream. Transform blockiness effect may be associated with missing pixel information along one or more borders between neighboring macroblocks.

After receiving a reconstructed macroblock 475 from the reconstructor 435, the deblocker 440 may filter the reconstructed macroblock so as to mitigate the transform blockiness effect. In one aspect of the invention, the deblocker 440 may comprise a filter adapted to reduce the amount of missing pixel information along one or more borders between neighboring macroblocks. For example, the deblocker 440 may smooth pixels at the edge of a macroblock to prevent the appearance of blocking. The deblocked macroblocks may be communicated via the connection 479 to the picture buffer 450.

Certain information related to the side information 461 and 465, as well as information related to the quantized frequency coefficients 463, may be communicated by the symbol interpreter 415 to the deblocker 440 via the connection 467. For example, the symbol interpreter 415 may inform the deblocker 440 that a current macroblock does not have any quantized frequency coefficients, and, therefore, no prediction error information may be associated with the current macroblock. In this regard, since the current macroblock may be characterized by a good prediction information without any prediction error, the deblocker 440 may skip deblocking the current macroblock.

The picture buffer 450 may be adapted to store one or more decoded pictures comprising deblocked macroblocks received from the deblocker 440 and to communicate one or more decoded pictures to the display engine 445 and to the motion compensator 430. In addition, the picture buffer 450 may communicate a previously decoded picture back to the deblocker 440 so that the deblocker may deblock a current macroblock within a current picture.

A decoded picture buffered in the picture buffer 450 may be communicated via the connection 481 to a display engine 445. The display engine may then output a decoded video stream 483. The decoded video stream 483 may be communicated to a video display, for example.

If the motion compensator 430 is used for temporal prediction of a current macroblock within a current picture, the picture buffer 450 may communicate a previously decoded reference picture information to the motion compensator 430 via the connection 477. The previous picture information may be required by the motion compensator 430 to temporally predict a current macroblock within a current picture.

In another aspect of the invention, the symbol interpreter 415, the spatial predictor 420, the ISQDCT 425, the motion compensator 430, the reconstructor 435, the deblocker 440, and the display engine 445 may be hardware accelerators under a control of a CPU, such as CPU 414, for example.

In yet another aspect of the invention, buffering may be used prior to symbol interpreting so that the rate differences between the incoming video stream data 404, which is generally characterized by a constant bit rate, and the decoding process, which is generally bursty, may be reduced. In this regard, a code buffer 405 may buffer the encoded video stream 404 prior to symbol interpretation. After the encoded video stream 404 is buffered, it may be communicated to the symbol interpreter 415 for symbol interpretation.

The symbol interpreter 415 may generate the plurality of quantized frequency coefficients from the encoded video stream. The video stream 404 received by the symbol interpreter 415 may be encoded utilizing CAVLC and/or CABAC. In this regard, the symbol interpreter 415 may comprise a CAVLC interpreter and a CABAC interpreter, for example, which may be adapted to interpret CAVLC and/or CABAC-encoded symbols, respectively. After symbol interpretation, the symbol interpreter may communicate quantized frequency coefficients 463 to the ISQDCT 425, and side information 465 and 461 to the spatial predictor 420 and the motion compensator 430, respectively.

In instances where the encoded video stream 404 comprises temporal prediction mode information, the motion compensator 420 may generate a plurality of temporal prediction pixels 473. In instances where the encoded video stream 404 comprises spatial prediction mode information, the spatial predictor 420 may generate a plurality of spatial prediction pixels 469. The motion compensator 430 may be adapted to receive side information 461 from the symbol interpreter 415. The side information 461 may comprise macroblock partition information, macroblock coding direction information, as well as motion vectors information. For example, the macroblock partition information may correspond to a 16×8, 8×16, 8×8, 4×8, 8×4, and/or a 4×4 partition. In addition, the side information 461 may comprise macroblock coding information. Macroblock coding information within the side information 461 may indicate whether bi-directional coding, for example, was used to encode the macroblocks.

The motion vector information within the side information 461 may comprise motion vector weight information and frame/field duration information. After the side information 461 is communicated to the motion compensator 430, the motion compensator 430 may generate a plurality of temporal prediction pixels. In instances where bi-directional coding was used to encode macroblocks, two prediction blocks, with corresponding motion vector weight information, frame/filed duration information and motion vector information, may be utilized to predict each of the plurality of temporal prediction pixels.

The spatial predictor 420 may be adapted to receive side information 465 from the symbol interpreter 415. The side information 465 may comprise a prediction mode information related to a prediction mode used during spatial prediction. For example, the prediction mode information may comprise a 16×16, an 8×8 or a 4×4 mode information, indicating the size of the macroblock partition used during prediction of the prediction pixels. After receiving the side information 465, the spatial predictor 420 may generate a plurality of spatial prediction pixels. The spatial predictor 420 and the motion compensator 430 may be selected depending on the prediction mode information within the encoded video stream received by the symbol interpreter 415.

The inverse scanner, quantizer and transformer (ISQDCT) 425 may be adapted to receive a plurality of quantized frequency coefficients and generate a prediction error. More specifically, the ISQDCT 425 may generate a prediction error 471 from a plurality of quantized frequency coefficients 463 generated by the symbol interpreter 415 from the encoded video stream 404. After the ISQDCT 425 generates the prediction error 471, the prediction error 471 may be communicated to the reconstructor 435. The reconstructor 435 may also be adapted to receive prediction pixels from either the spatial predictor 420 or the motion compensator 430. For example, the reconstructor 435 may receive spatially predicted pixels 469 or temporally predicted pixels 473. The reconstructor 435 may generate a current macroblock 475 using the prediction error 471 and spatially predicted pixels 469 or temporally predicted pixels 473. In this regard, the reconstructor 435 may generate a macroblock from a plurality of temporal or spatial prediction pixels based on a generated plurality of prediction errors.

After generating a decoded macroblock, 475, the macroblock may be communicated to the deblocker 440. The deblocker 440 may deblock the generated macroblock 475 and mitigate the effects of transform blockiness, for example. The deblocked macroblock may then be buffered by the picture buffer 450. Buffered macroblock information may be subsequently utilized by the motion compensator 430, the deblocker 440 and/or the display engine 445.

Figure 5:
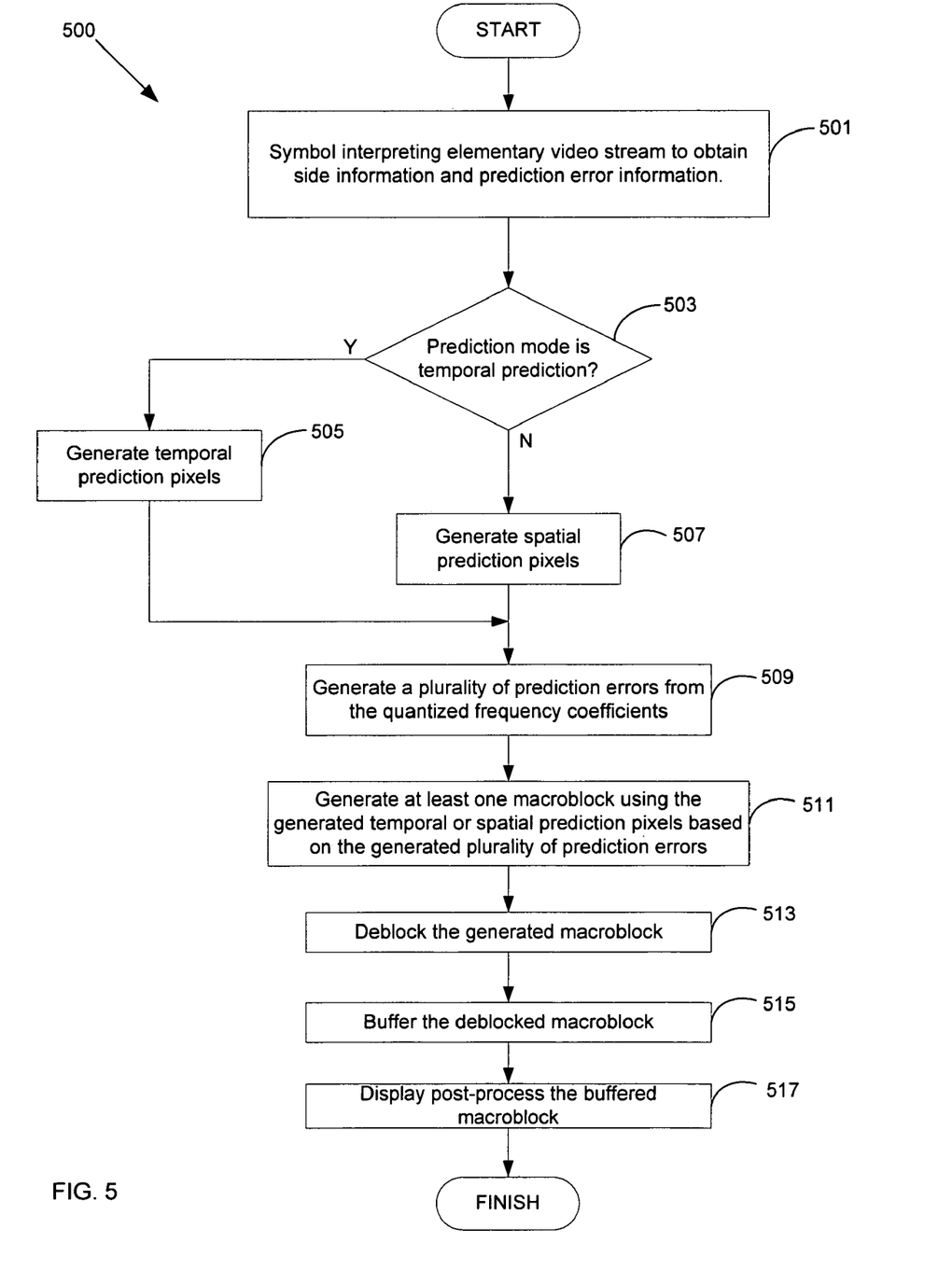
FIG. 5 is a flow diagram of an exemplary method for processing an encoded video stream, in accordance with an embodiment of the invention.

FIG. 5 is a flow diagram of an exemplary method 500 for processing an encoded video stream, in accordance with an embodiment of the invention. Referring to FIG. 5, at 501, an elementary video stream may be symbol-interpreted to obtain side information and prediction error information. The side information may comprise prediction mode information and motion vectors information. At 503, it may be determined whether the prediction mode information comprises temporal prediction. If the prediction mode information comprises temporal prediction, temporal prediction pixels may be generated at 505. If the prediction mode information does not comprise temporal prediction, spatial prediction pixels may be generated at 507. At 509, a plurality of prediction errors may be generated utilizing the quantized frequency coefficients interpreted from the elementary video stream. At 511, a macroblock may be generated using the generated temporal or spatial prediction pixels, based on the generated plurality of prediction errors. At 513, the generated macroblock may be deblocked to reduce transform blockiness effects, for example. At 515, the deblocked macroblock may be buffered for subsequent use during motion compensation. At 517, the buffered deblocked macroblock may be post-processed, for example by a display engine, for subsequent display.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing an encoded video stream, the method comprising:
   using a predictor for generating a plurality of temporal or spatial prediction pixels based on mode information within the encoded video stream;
   using a transformer for generating a plurality of prediction errors from a plurality of quantized frequency coefficients generated from the encoded video stream;
   using a reconstructor for generating at least one current macroblock using said generated plurality of temporal or spatial prediction pixels based on said generated plurality of prediction errors;
   symbol interpreting the encoded video stream at a symbol interpreter; and
   providing an indicator from the symbol interpreter to a deblocker, said indicator indicating whether said at least one current macroblock is coded using spatial or temporal coding.

2. The method according to claim 1, further comprising symbol interpreting the encoded video stream using context adaptive video length coding (CAVLC).

3. The method according to claim 1, further comprising symbol interpreting the encoded video stream using context adaptive binary arithmetic coding (CABAC).

4. The method according to claim 1, further comprising buffering the encoded video stream prior to said symbol interpretation.

5. The method according to claim 1, further comprising generating said plurality of quantized frequency coefficients from the encoded video stream.

6. The method according to claim 1, further comprising generating said plurality of temporal prediction pixels, if the encoded video stream comprises temporal prediction mode information.

7. The method according to claim 1, further comprising generating said plurality of spatial prediction pixels, if the encoded video stream comprises spatial prediction mode information.

8. The method according to claim 1, further comprising deblocking said generated at least one current macroblock.

9. The method according to claim 8, further comprising buffering said deblocked at least one current macroblock.

10. The method according to claim 9, further comprising generating a subsequent plurality of temporal prediction pixels utilizing at least said buffered at least one macroblock.

11. The method of claim 1, wherein the symbol interpreter further comprises a hardware accelerator.

12. The method of claim 11, wherein the deblock further comprises another hardware accelerator.

13. The method of claim 1, wherein the symbol interpreter further comprises a processor.

14. A system for processing an encoded video stream, the system comprising:
a motion compensator that generates a plurality of temporal prediction pixels based on mode information within the encoded video stream;
a spatial predictor that generates a plurality of spatial prediction pixels based on said mode information within the encoded video stream;
a transformer that generates a plurality of prediction errors from a plurality of quantized frequency coefficients generated from the encoded video stream;
a reconstructor that generates at least one current macroblock using said generated plurality of temporal or spatial prediction pixels based on said generated plurality of prediction errors;
a symbol interpreter for symbol interpreting the encoded video stream; and
a deblocker for deblocking the at least one current macroblock; and
wherein the symbol interpreter provides an indicator to the deblocker, said indicator indicating whether said at least one current macroblock is coded using spatial or temporal coding.

15. The system according to claim 14, wherein said symbol interpreter symbol interprets the encoded video stream using CAVLC.

16. The system according to claim 14, wherein said symbol interpreter symbol interprets the encoded video stream using CABAC.

17. The system according to claim 14, further comprising a code buffer that buffers the encoded video stream prior to said symbol interpretation.

18. The system according to claim 14, wherein the symbol interpreter generates said plurality of quantized frequency coefficients from the encoded video stream.

19. The system according to claim 14, wherein said motion compensator generates said plurality of temporal prediction pixels, if the encoded video stream comprises temporal prediction mode information.

20. The system according to claim 14, wherein said spatial predictor generates said plurality of spatial prediction pixels, if the encoded video stream comprises spatial prediction mode information.

21. The system according to claim 14, further comprising a deblocker that deblocks said generated at least one current macroblock.

22. The system according to claim 21, further comprising a buffer that buffers said deblocked at least one current macroblock.

23. The system according to claim 22, wherein the predictor generates a subsequent plurality of temporal prediction pixels utilizing at least said buffered at least one macroblock.

24. The system according to claim 14, wherein said transformer comprises an inverse scanner, quantizer and transformer (ISQDCT).

25. A decoding circuit, comprising:
a code buffer coupled to an interpreter;
a context block operably coupled to said interpreter to generate a context for the interpreter;
an inverse scanner, quantizer and transformer (ISQDCT) operably coupled to an output of said interpreter to inverse scan, dequantize, and inverse transform output from the interpreter;
a motion compensator coupled to said output of said interpreter to generate a prediction error for the output of the interpreter, wherein the output of the interpreter is temporally predicted;
a spatial predictor operably coupled to said output of said interpreter to generate a prediction error for the output of the interpreter, wherein the output of the interpreter is spatially predicted;
a reconstructor operably coupled to an output of said ISQDCT to apply the prediction error from either the motion compensator or spatial predictor to the output of the ISQDCT;
a deblocker operably coupled to an output of said reconstructor to deblock the output of the reconstructor;
a picture buffer operably coupled to an output of said deblocker to store the output of the deblocker; and
a display engine operably coupled to said picture buffer to provide a picture for display.

26. The decoding circuit according to claim 25, wherein said interpreter comprises a CAVLC interpreter.

27. The decoding circuit according to claim 25, wherein said interpreter comprises a CABAC interpreter.

28. The decoding circuit according to claim 25, further comprising a CPU coupled to said interpreter.

29. The decoding circuit according to claim 25, wherein an output of said spatial predictor is coupled to a first input of said reconstructor.

30. The decoding circuit according to claim 25, wherein an output of said motion compensator is coupled to a second input of said reconstructor.

31. The decoding circuit according to claim 25, wherein said interpreter is coupled to a first input of said deblocker.

32. The decoding circuit according to claim 25, wherein said picture buffer is coupled to a second input of said deblocker.

33. The decoding circuit according to claim 25, wherein said picture buffer is coupled to an input of said motion compensator.

34. The decoding circuit according to claim 25, wherein the interpreter is operably coupled to the deblocker and operable to provide an indicator to the deblocker, said indicator indicating whether a macroblock is coded using temporal coding or spatial coding.

* * * * *

UNITED STATES PATENT AND TRADEMARK OFFICE
CERTIFICATE OF CORRECTION

| | | |
|---|---|---|
| PATENT NO. | : 7,613,351 B2 | Page 1 of 1 |
| APPLICATION NO. | : 10/963677 | |
| DATED | : November 3, 2009 | |
| INVENTOR(S) | : Timothy Hellman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1390 days.

Signed and Sealed this

Nineteenth Day of October, 2010

David J. Kappos
*Director of the United States Patent and Trademark Office*